United States Patent [19]

Heinz

[11] 3,803,469

[45] Apr. 9, 1974

[54] SYSTEM FOR CONTROLLING SPEED OF THE TAPE DRIVE IN A TAPE RECORDING AND REPLAYING APPARATUS

[75] Inventor: Richard Heinz, Pfungstadt, Germany

[73] Assignee: Robert Bosch Fernsehanlagen GmbH, Darmstadt, Germany

[22] Filed: Feb. 5, 1973

[21] Appl. No.: 329,663

Related U.S. Application Data

[62] Division of Ser. No. 254,400, May 18, 1972.

[30] Foreign Application Priority Data

May 21, 1971 Germany............................ 212492

[52] U.S. Cl. ............................................. 318/327
[51] Int. Cl. ........................................... H02p 5/16
[58] Field of Search ......................... 318/326–328, 318/345

[56] References Cited

UNITED STATES PATENTS

| | | | |
|---|---|---|---|
| 3,543,115 | 11/1972 | Grygera | 318/327 |
| 3,599,063 | 8/1971 | Nanai | 318/327 |

*Primary Examiner*—Bernard A. Gilheany
*Assistant Examiner*—Thomas Langer
*Attorney, Agent, or Firm*—Ernest F. Marmorek

[57] ABSTRACT

A tape recording and replaying apparatus having therein a system for controlling the speed of the tape drive, including a capstan motor, a tachometer for generating a voltage signal proportional to the number of the revolutions of the capstan motor, an integrating type operational amplifier receiving the voltage signal of the tachometer being coupled to the input of the operational amplifier; a circuit including a potentiometer for setting the speed of the capstan motor at a selectively variable predetermined value, a circuit coupled to the speed setting devices and generating a control voltage representative of the set speed and connecting it through the integrator to the energizing circuit of the capstan motor, whereby at sudden changes of the speed setting device the rate of change of the energizing current for the capstan motor remains substantially constant. The invention also discloses as a further aspect the limiting of the above control signal if the tape widing motors are overdriven at excess speeds.

1 Claim, 4 Drawing Figures

SYSTEM FOR CONTROLLING SPEED OF THE TAPE DRIVE IN A TAPE RECORDING AND REPLAYING APPARATUS

This is a division, of application Ser. No. 254,400, filed May 18, 1972.

FIELD OF THE INVENTION

The present invention relates to a system for the controlling of the number of the revolutions of a capstan motor of a tape recording apparatus especially during the process of rewinding and, wherein a signal is derived from a tacho-generator associated with the capstan. The invention is also concerned in a system of the above-mentioned type to control the number of revolutions of the capstan motor in order to avoid undesirable high accelerations.

BACKGROUND OF THE PRESENT INVENTION

During the rewinding process in magnetic tape recording apparatus it is necessary that the number of the revolutions of the capstan motor could be regulated within wide limits. Such regulation is desirable, on one hand, in order that the rewinding time could be reduced while, on the other hand, it is desirable in order to use a relatively low speed when a certain part of the tape is to be located. For this reason in proposed devices the capstan motor has a tacho-generator associated therewith which delivers pulses which in turn are converted into an analog electrical signal. Such analog electrical signal is then compared with an adjustable control voltage and the result of such comparison is fed to the motor. Such proposed arrangements turned out to be unreliable with respect to their digital-analog conversions which develops difficulties due to the wide limits exiting between the higher and lower sides of the rewinding speeds.

It has been also found that during rewinding of the magnetic tape while the speed of the tape is varied within a large limit, there is a necessity for appropriately designed controlling devices. It has also been found that during a jump-like or sudden operation of the operating keys or knobs, undesirable and very high accelerations take place which may cause damage to the magnetic tape.

SUMMARY OF THE INVENTION

It is, therefore, an object of the present invention to provide an improved and novel system for the controlling of the revolutions of the capstan motor in a tape recording apparatus in which the above described disadvantages of known or proposed apparatus are eliminated.

It is another object of the present invention to provide in the above-described tape recording apparatus a control system which is capable of limiting the accelerations are eliminated.

According to the present invention the output signal of a tachometer is fed over a coupling circuit including a resistor means to the input of an operational amplifier which is connected as an integrator and, over a further resistor means the same input of the operational amplifier is supplied with a control voltage containing the new speed instructions in regulated form and, that the output of the operational amplifier is coupled over a power amplifier with the capstan motor. According to the present invention by superimposing the control voltage and the signal output of the tacho-generator by using the subsequent integrating the result is obtained that for the entire speed range of the capstan motor the input voltage of the operational amplifier becomes near zero volt. As a result, a number of revolutions will set in at which the control voltage will equal to the man value of the signal of the tachometer.

As a tacho-generator signal a d.c. or unidirectional voltage signal is employed which is proportional to the number of revolutions or a pulse-like signal can also be considered the repetition frequency of which is proportional to the number of revolutions.

A further extension of the principle of the present invention provides that by using pulses as the tachometer signal, the tachometer will have two outputs at which pulses can be taken off the frequency of which is proportional to the number of revolutions and the phase difference of which is about 90° with respect to each other.

As a further extension of the inventive concept it is provided that the tacho-generator pulses contain an information which can be made available and such information relating to the direction of the revolutions and, as a result, a continuous transition from one direction of revolutions can be had into another direction of the revolutions.

The present invention in another aspect thereof provides that the control voltage containing the desired speed information is applied to a non-inverting input of a of a first amplifier and a voltage which is proportional to the number of revolutions of the motor is applied to the inverting input of the first amplifier and, wherein the output of the first amplifier is coupled over a resistor means with the input of a second amplifier connected as an integrator and wherein the output voltage of the second amplifier is fed to the capstan motor directly or in some cases by the intermediate coupling of a power amplifier.

The invention also provides that during the stable state of the control arrangement the capstan motor has a number of revolutions which corresponds exactly to the set control voltage containing the desired speed information and that the time-wise changes of the operating voltage of the capstan motor consequently also its acceleration remain constant and independent from the jump-like changes in the control voltage until the set number of revolutions are reached and remain totally independent from the magnitude of any jump-like change in the system.

The invention will become more readily apparent from the following description of preferred embodiments thereof shown in the accompanying drawings, in which.

DESCRIPTION OF THE PREFERRED EMBODIMENTS

Figure 1:
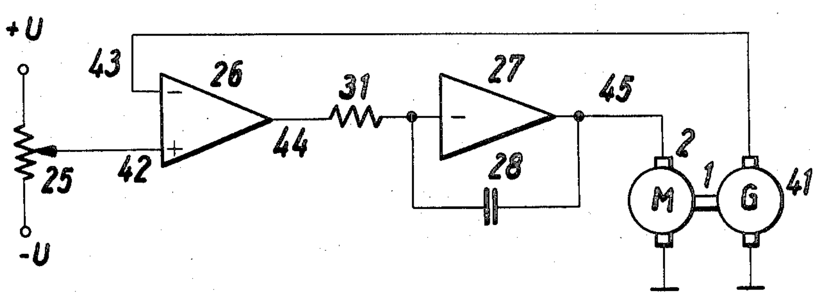
FIG. 1 is a block diagram illustrating an embodiment of the present invention as applied to the capstan drive of a tape recording apparatus.

With reference to FIG. 1, it is seen that to a shaft 1 of a capstan motor 2 a tachometer or generator 3 is coupled. The tachometer 3 can be made for example in the form of a disc which has a certain number of slots provided therein and which in turn is scanned by a light ray device the interruptions of which are sensed by a pick-up device. According to the present invention the tachometer 3 has outputs 4 and 5 on which pulses can be taken off the frequency of which is proportional to the number of revolutions of the shaft 1. The phase relationship of the output 5 is different by about 90° with respect to the same pulses available at output 4.

Figure 2:
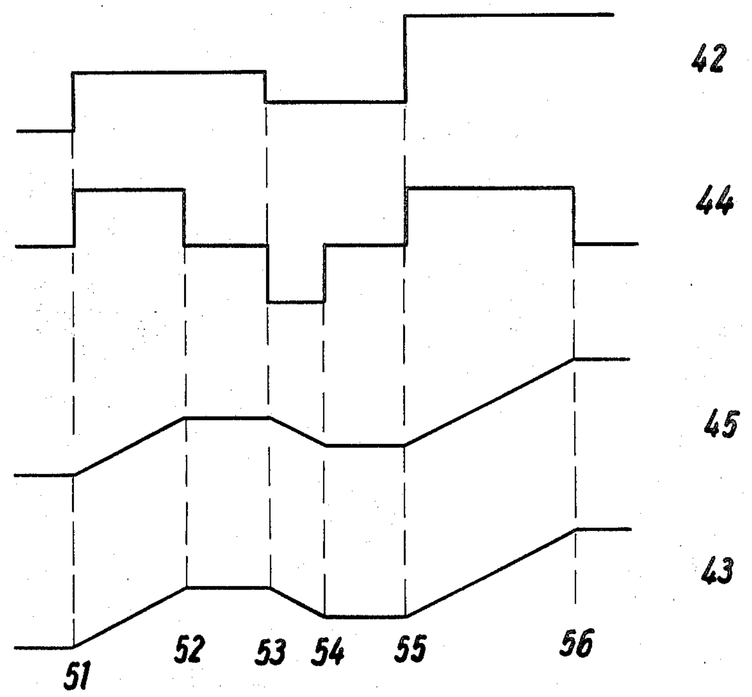
FIG. 2 illustrates a set of diagrams representing the voltages in relation to time as they appear in the various places of the block diagram of FIG. 1.

For a much clearer understanding of the present invention reference should be had to the voltage diagrams of FIG. 2 represented with respect to time and depicting the various voltages appearing at various points in FIG. 1. The voltages and pulses in the left hand column *a* appear on the capstan motor rotated in one direction while the voltages and pulses represented in column *b* appear when the capstan motor rotates in the opposite direction. In line D of FIG. 2 the pulses of the output 4 of the tachometer 3 are illustrated which are fed to the input of a monostable multivibrator 6 and also to the D input of a D-flip-flop 9. The pulses of the output 5, line T on the diagram and which are fed to the clock input T of the D-flip-flop 9, are noticed to lead the pulses of line D in column *a*, while they lag the pulses of line D in column *b*.

The D-flip-flop 9 has the property that during a rise from O to L of the signal fed to the input T the value available at this time instant at the D input will be transferred to the output Q and will be retained there until the next jump from O to L at the clock input T. As can be more clearly seen in FIG. 2 by the dashed line representation the signal D during the jump of the clock signal T from O to L, has a value of O. From this it follows that during a rotation as in the left column the Q output of the D-flip-flop 9 has a value of O and at the same time the Q output has a value of L, while during a rotation as in the right column the Q output has a value of L, and the Q output is O.

The monostable multi-vibrator 6 becomes triggered by the leading edges of the signals represented in line D. At the output of the monostable multi-vibrator 6 pulses become available the width of which is independent from the frequency of the pulses fed to it, that is, which are also independent from the number of revolutions of the motor 2. The pulses represented at 10 in FIGS. 1 and 2 are each fed to an input of the AND-type switching members 7 and 8. The other inputs members of 7 and 8 are supplied by the output signals available at the Q and Q outputs of the D-flip-flop 9. At the outputs 11 and 12 of the AND switching members 7 and 8 there becomes available a series of pulses represented in lines identified by 11 and 12 in FIG. 2. These pulse trains control the electronic switching networks 15 and 16 in such a manner that during the appearance of a L signal at the control input of one of the electronic switching means 15 and 16, that switching means becomes conducting. The electronic switching means 15 is returned to a positive voltage, such as +12 volts, while the electronic switching means 16 is returned to a negative voltage source having a similar magnitude. At the joint 13 the pulses illustrated in line identified by 13 of FIG. 2 are available.

The voltage appearing at point 13 is fed over a resistor 17 to the input 18 of an operational amplifier 19. The output of the amplifier 19 is coupled over a capacitor 21 with the output 18 so that an integrating circuit is formed.

Also to input 18 over a further resistor 22 and over the point 14 a control voltage containing the selected speed instructions is fed to set the number of revolutions of the motor 2.

The output voltage of the operational amplifier 19 is fed to the motor 2 over a power amplifier 23. Due to the effect of the integrator 19, 21, a stabilized state of the system is reached only when the time integral of the current in resistor 17 corresponds to the negative value of the time integral of the current in resistor 22.

In order to illustrate more clearly such relationship the corresponding values are shown shaded in FIG. 2 in line 14.

Since the amplitude of the pulses appearing at point 13 are constant due to the constant nature of the applied voltage and the width of the pulses are determined by the time constant of the monostable multivibrator 6, the time integral depends, only on the number of pulses appearing within a time unit. It follows from the above description of the upper part of FIG. 1 that an accurate regulation of the speed of motor 2 is attained.

An especially advantageous circuit arrangement for the obtaining a smoothing of the control voltage at point 14 will now be described and illustrated in the lower portion of FIG. 1. Such circuit portion as described below has a function to control that the revolutions of the motor 2 should not undergo sudden rate changed during high accelerations. The number of revolutions of the motor 2 are set by means of a potentiometer 25. In order to prevent that the control voltage at point 14 will follow in a jump-like fashion a sudden operation of the potentiometer 25, one could provide a simple domping device consisting of a resistor and a capacitor. Such damping device, however, would have the disadvantage that during a small but sudden change in the potentiometer positioning the follow-up of the control voltage at point 14 would take as long as during a large sudden change in the setting. As a result, the maximum permissible acceleration of the motor 2 would not be made use of at small changes of the potentiometer setting. In order to eliminate this disadvantage a circuit arrangement consisting of two operational amplifiers 26 and 27 is provided of which the first one is a differential amplifier and the second one due to the presence of capacitor 28 and resistor 31 is formed as an integrator unit. The resistors 29, 30, 31, 32 as well as the electronic switching means 33 and 34 as far as the limiting of the accelerations of motor 2 at quick changes of the potentiometer setting 25 have no effect and therefore their description with respect to this aspect of the invention can be omitted. They will be, however, play a role with respect to another aspect of the invention.

The voltage taken off from the wiper arm of the potentiometer 25 if fed to the non-inverting input of the differential amplifier 26. When the arrangement is in a stable state, the voltage at 14 has the same value as the voltage on the wiper arm of the potentiometer 25 so that the output of the differential amplifier 26 one can observe approximately O volt. Since such voltage is fed to the input of the integrator 27,28, the output voltage of the integrator circuit 27,28 and the voltage at 14 remains constant. If, however, the wiper arm of the potentiometer 25 moves, then at the output of the differential amplifier 26 a positive or negative voltage will appear which will cause a time-wise linear rise or fall of the output voltage of the integrator 27,28 until the voltage at point 14 will correspond to the newly set voltage value on resistor 25. Inasmuch as the amplification of the differential amplifier 26 is very high and even at slight deviations the output voltages thereof will approach either its positive or negative extreme value, the rate of rise of the output signal of the integrator circuit 27,28 is independent from the magnitude of the set voltage jump appearing at the non-inverting input of the differential amplifier 26.

In the modern day tape recording apparatus the drive motors for the supply reels usually called the winding motors are controlled according to the speed predetermined by the capstan motor 2. Frequently vacuum columns are provided in order to offset sudden speed changes of the magnetic tape in order that large accelerating forces would not affect the reels and the tape wound on them. If it sometimes would happen that the reel motors would have to exert a large rotational momentum in order to meet the acceleration set by the capstan drive, then in accordance with a further aspect of the inventive principle there is provided that the rise of the control voltage in the integrating circuit portion is inhibited when the current at least in one reel motor exceeds the predetermined value or when the operating voltage of the reel motor is not sufficient in order that the required number of revolutions could be attained, especially during an acceleration phase.

In the circuit or rather block diagram of FIG. 1 for sake of simplicity only a single reel or winding motor 35 is illustrated in the energizing circuit of which between the terminals 37 and 36 a current sensing device 38 in a simple embodiment can be made in the form of a resistor the voltage drop across which is fed for further use as hereinafter described. Such voltage drop being proportional to the motor current through motor 35 reaches a threshold device 39 the output voltage of which jumps from 0 to 1, for example, as soon as the motor current through motor 35 exceeds a predetermined limit value. The control voltage for the limiting purpose according to the present invention in the case of a small operating voltage will be obtained in a manner that with an amplifier switched into the circuit one will ascertain whether during the testing steps in/out the signal magnitude ratio will approach the value of 1 or not. This will be the case when the motor current is on for longer than about $(2\text{–}10)x\mathrm{T}$ where T is the electrical time constant of the motor.

The output signal of the threshold value device 39 is fed as a control voltage to the switching means 33 which when a limiting value has been exceeded will become conductive. As a result, the voltage taken off from the potentiometer 25 becomes shorted through it. Simultaneously, the switching means 34 becomes also closed and consequently, the resistors 30, and 32 operating as voltage dividers pass only a portion of the voltage of the output voltage of the differential amplifier 26 to the integrating unit comprising the amplifier 27, the capacitor 28 and the resistor 31. If the motor current on motor 35 sinks below the predetermined maximum limit, then the switching means 33 becomes open again and the set control voltage on potentiometer 25 becomes fed again to the amplifier 26. In order that the control voltage at point 14 would not again rise undesirably steeply, the output pulse of the threshold device 39 is stretched with the help of a monostable flip-flop 40 so that after the limiting value is not exceeded, the effect of the above-mentioned voltage divider circuit between the amplifiers 26 and 27 remains effective and the voltage at point 14 becomes rising slower than if the switching means 34 would be open.

The above described circuit arrangement makes it possible that the number of revolutions of the capstan motor 2 can be continuously regulated within wide limits, such as within the range of 1:1000. It is noted that the operating key or device, such as the potentiometer 25, should have a characteristic which allows for setting exactly and conveniently the number of revolutions of the motor 2 in all portions of a wide range. In the case of the potentiometer 25 which at both ends is returned to a positive and negative voltage source, respectively, the above requirement can be met by providing for an exponential characteristic line starting from the middle of the range. Inasmuch as the last mentioned type potentiometers for general purpose are not readily available in the industry, in accordance with a further aspect of the inventive principle the linear potentiometer 25 is mechanically and fixedly coupled with a further potentiometer 41 which is provided with a center tap and by means of a slider arm is electrically connected with the slider or wiper arm of the potentiometer 25 while the end contact points of the potentiometer 41 remain without connections.

When both wiper arms are in the center position, a voltage having a value of O is obtained. On the other hand, however, when the wiper arms move in the direction of one or the other end point then at a small deviation form the center position the resistance between the wiper arm of the potentiometer 25 and resulting from the above-mentioned resistance relationship of the two potentiometers is relatively small and is practically shorted out. On the other hand, if the deflection of the wiper arm increases from the center position then the wiped or covered resistance of the potentiometer 25 which is formed by the parallel connection of both partial resistors of 25 and 41, is small while the resistance between the wiper arm and the center tap of the potentiometer 41 becomes larger.

It follows from the above that the voltage delivered to the amplifier 26 during operation of the potentiometer 25 away from its center position first will rise slowly and later much steeper.

Figure 3:
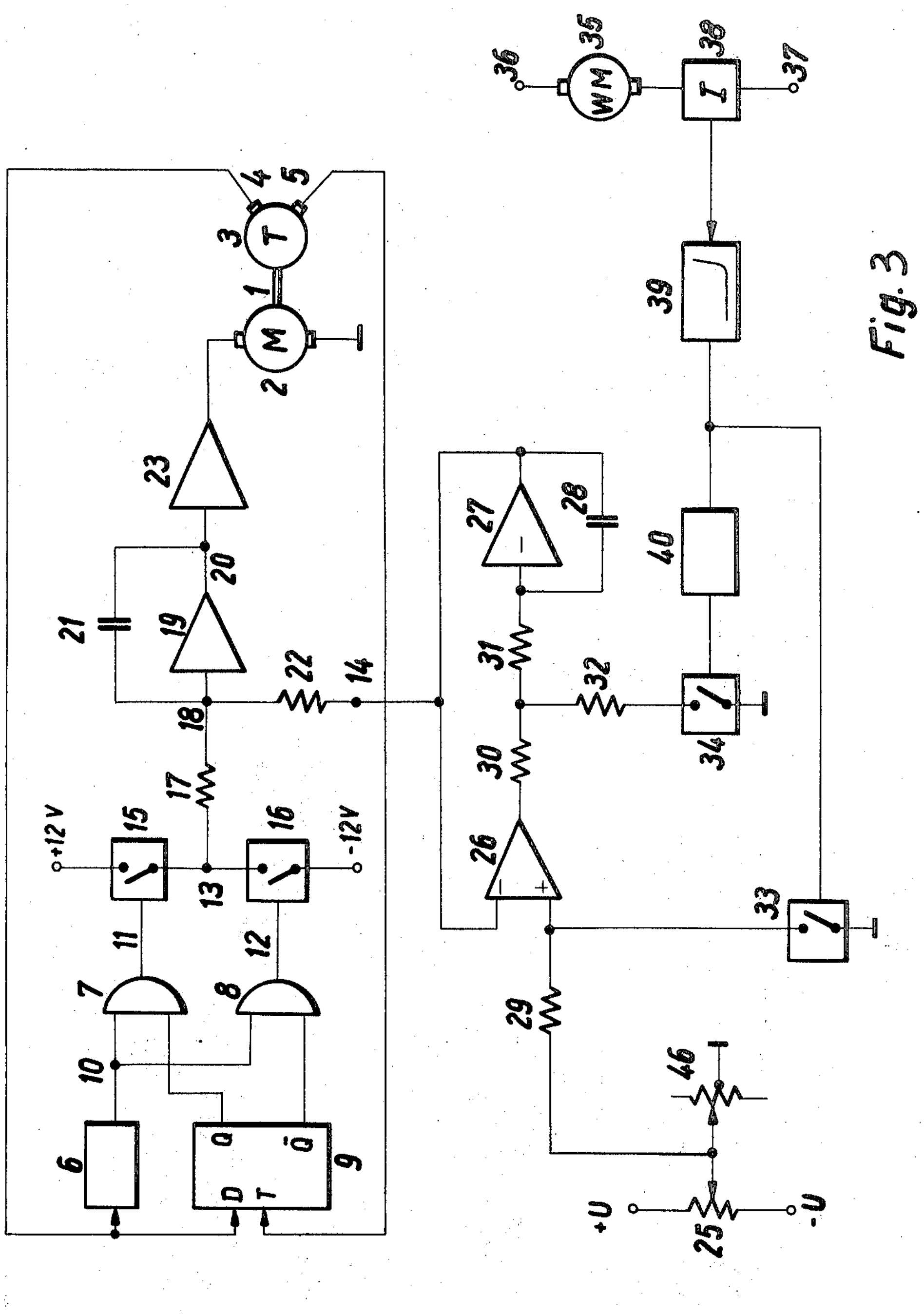
FIG. 3 illustrates in block diagram form a further improvement to the system illustrated in FIG. 1.

With reference to FIG. 3 describing another embodiment of the invention, it is seen that with the help of potentiometer 25 the end points of which are returned to positive and negative voltage sources, respectively and having equal magnitudes, the number of revolutions of the capstan motor 2 can be adjusted. The control voltage delivered by potentiometer 25 reaches the non-inverting input 42 of the operational amplifier 26. As mentioned already in connection with FIG. 1 the shaft 1 of the capstan motor 2 has a tacho-generator 41 coupled thereto. The tacho-generator 41 delivers an output voltage proportional to the number of revolutions of the shaft 1 which is delivered to the inverting input 43 of the operational amplifier 26.

Figure 4:
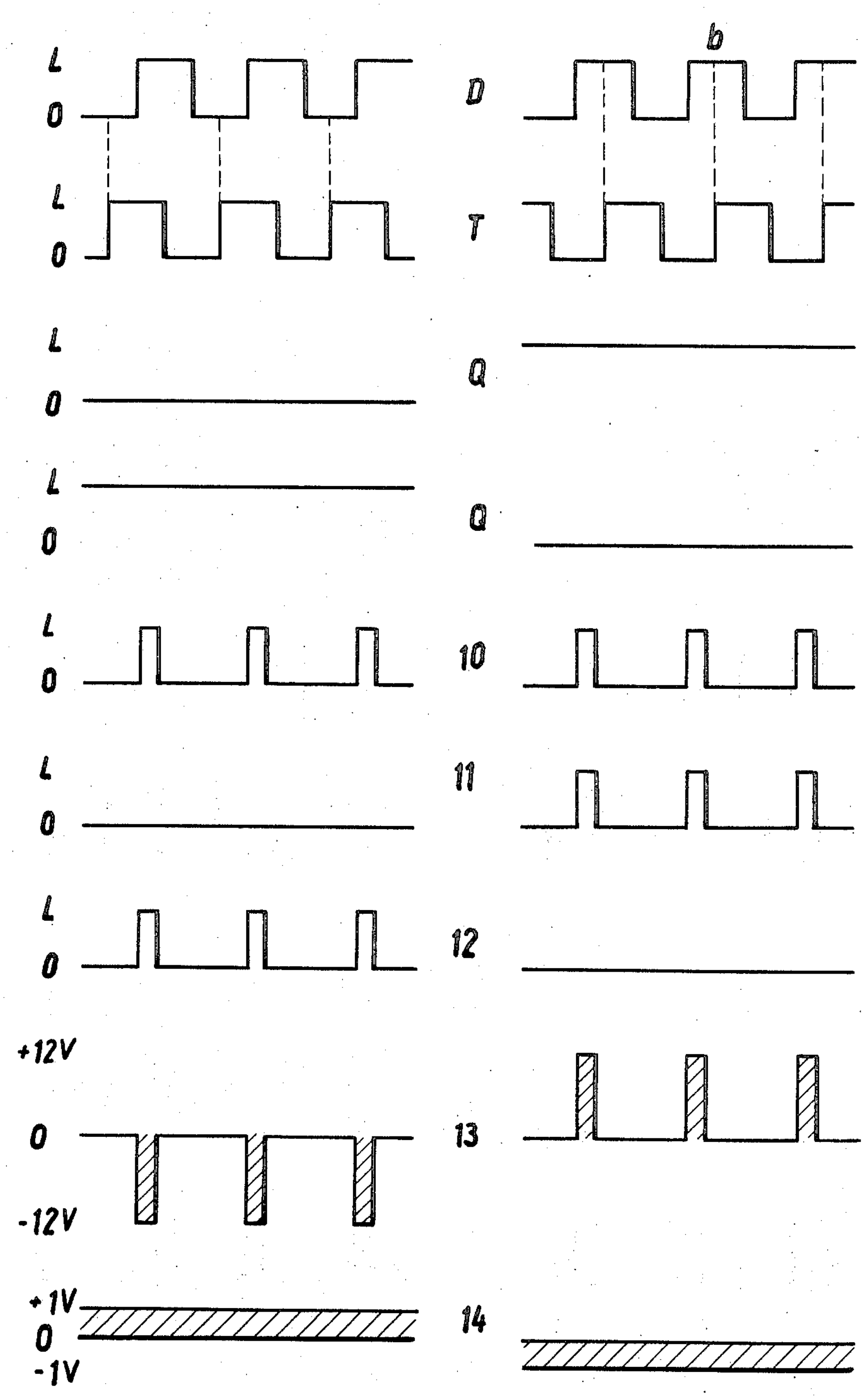
FIG. 4 is a time-voltage diagram of some of the voltages appearing in the block diagram in FIG. 3.

The behavior characteristic of the control voltage at input 42 with respect to time is illustrated by line 42 in FIG. 4. The amplification of the operational amplifier 26 is so high that even at the slightest deviation of the input voltages from each other the output voltage at output 44 will assume one of the extreme values according to the sign of the deviation. Such output voltage is delivered to an integrating circuit which includes the operational amplifier 27, the capacitor 28 and a resistor 31.

The integrating circuit functions in a manner that when the output voltage 44 has a value of O volts, then the output voltage of the integrating circuit at 45 remains constant and, at an extreme value of the voltage at 44, the voltage at 45 will rise at a predetermined constant differential ratio or in the opposite case, will fall similarly. Reference should be had to lines 44 and 45 of FIG. 4.

Starting with a stable operating state at the time instant identified by 51 in FIG. 4, there is a jump in the control voltage as seen in line 42. Inasmuch as the output voltage of the integrating circuit at 45 and thereby the number of revolutions of the motor 2 cannot undergo a jump-like behavior, the voltage at the non-inverting input 42 of the operational amplifier 26 will be dominating, which will have its result in that the output voltage at 44 will assume the positive extreme value. Consequently, the motor voltage at 45 will undergo a time-wise linear increase. Inasmuch as the mechanical time constant of the motor 2 and of the mechanical components coupled therewith are small with respect to the time constant of the integrating circuit 27,28 the result is that the output voltage of the tacho-generator 41 follows substantially the motor voltage at 45.

As soon as the output voltage of the tacho-generator 41 reaches the value of the control voltage at time instant 52 in FIG. 4, the output voltage of the operational amplifier 26 jumps back to 0 volt, as a result of which an increase in the motor voltage becomes again checked. A similar process takes place between the time instants 53 and 54 in FIG. 4, however, with opposite signs, while between the time instants 55 and 56 the only difference is that the amplitudes of the voltages involved are larger. As can be seen clearly from the curve of FIG. 4, the acceleration of the motor 2 even at sudden changes in the control voltage, has a constant value which, for example, can be selected to fail closely under the maximum permissible acceleration so that the tape can be brought to the speed fed by the potentiometer 25 at the possibly shortest time.

I wish it to be understood that I do not desire to be limited to the exact details of construction shown and described, for obvious modifications will occur to a person skilled in the art.

Having thus described the invention, what I claim as new and desire to be secured by letters patent, is as follows:

1. In a tape recording and replaying apparatus, a system for controlling the speed of the tape drive means, said tape drive means comprising:

a capstan motor;

an energizing circuit for energizing said capstan motor;

tacho-generator means adapted to generate a voltage signal proportional to the rate of revolution of said capstan motor, said tacho-generator means having two output means;

said tacho-generator means generating a pulse signal for each of the said output means, said pulse signals having a frequency proportional to the rate of revolution of said capstan motor and having a phase difference of about 90° with respect to each other;

an operational amplifier means connected for operation as an integrator and having an input and output means;

rate control means for setting the rate of revolution of said capstan motor at a predetermined value;

control circuit means coupled to said rate control means and adapted to generate a control voltage representative of said predetermined value;

first resistor means coupling said control voltage to said input means of said operational amplifier means;

a power amplifier means coupled to the output means of said operational amplifier means and having an output means connected to said energizing circuit;

first coupling means for coupling the output means of said tacho-generator means to the input means of said operational amplifier means comprising a mono-stable multivibrator means having input means and output means, a flip-flop multivibrator means having first input and second input means;

one of said output means of said tacho-generator means being connected to both the input means of said mono-stable multivibrator means and the first input means of said flip-flop multivibrator means;

the other of said output means of said tacho-generator means being connected to the second input means of said flip-flop multivibrator means;

said flip-flop multivibrator means having two output means;

two AND switching means each having two input means and each having an output means;

the output means of said mono-stable multivibrator means being connected to one input means of each of said AND switching means;

each of said output means of said flip-flop multivibrator means being connected to a respective one of the second output means of said AND switching means;

second coupling means coupling the output means of one of said AND switching means to a voltage source of one polarity;

third coupling means coupling the output means of the other said AND switching means to a voltage source of opposite polarity; and second resistor means for coupling the output means of both of said AND switching means to the input means of said operational amplifier means.

* * * * *